United States Patent
Tekic et al.

(10) Patent No.: US 12,524,406 B2
(45) Date of Patent: Jan. 13, 2026

(54) JOIN SPECIFIC MATERIALIZED VIEW QUERY REWRITE FOR QUERIES USING UNIFIED DIMENSION TABLES

(71) Applicant: Oracle International Corporation, Redwood Shores, CA (US)

(72) Inventors: Mihajlo Tekic, Redwood City, CA (US); Praveen Tupati Jaganath Kumar, Bangalore (IN); Murali Thiyagarajah, Concord, NH (US); Andrew Witkowski, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/227,284

(22) Filed: Jul. 27, 2023

(65) Prior Publication Data

US 2025/0036623 A1   Jan. 30, 2025

(51) Int. Cl.
*G06F 16/2453* (2019.01)

(52) U.S. Cl.
CPC .. *G06F 16/24544* (2019.01); *G06F 16/24539* (2019.01)

(58) Field of Classification Search
CPC .............. G06F 16/24544; G06F 16/24539
See application file for complete search history.

(56) References Cited

U.S. PATENT DOCUMENTS

| | | | |
|---|---|---|---|
| 6,345,272 B1 | 2/2002 | Witkowski et al. | |
| 6,477,525 B1 | 11/2002 | Bello et al. | |
| 6,496,819 B1 | 12/2002 | Bello et al. | |
| 7,440,963 B1 | 10/2008 | Bello et al. | |
| 2007/0083490 A1* | 4/2007 | Au | G06F 16/24544 |
| 2008/0288446 A1* | 11/2008 | Hu | G06F 16/2462 |
| 2017/0300515 A1* | 10/2017 | Finlay | G06F 16/221 |

* cited by examiner

*Primary Examiner* — Cam Y T Truong
(74) *Attorney, Agent, or Firm* — Hickman Becker Bingham Ledesma LLP; Stephen R. Tkacs

(57) ABSTRACT

A method and one or more non-transitory storage media for materialized view-based query rewrite are provided. A plurality of materialized views is created based on a fact table and a dimension table. Each materialized view is based on a join between the dimension table and the fact table based on a respective foreign key column of the fact table. A database management system executes a query against the fact table and the dimension table, the query requiring one or more joins between the dimension table and the fact table based on one or more foreign key columns. For each given join of the one or more joins, responsive to the given join satisfying one or more rewrite criteria, the query is rewritten to replace the join between the dimension table and the fact table with a join between a respective materialized view for the given join and the fact table.

20 Claims, 6 Drawing Sheets

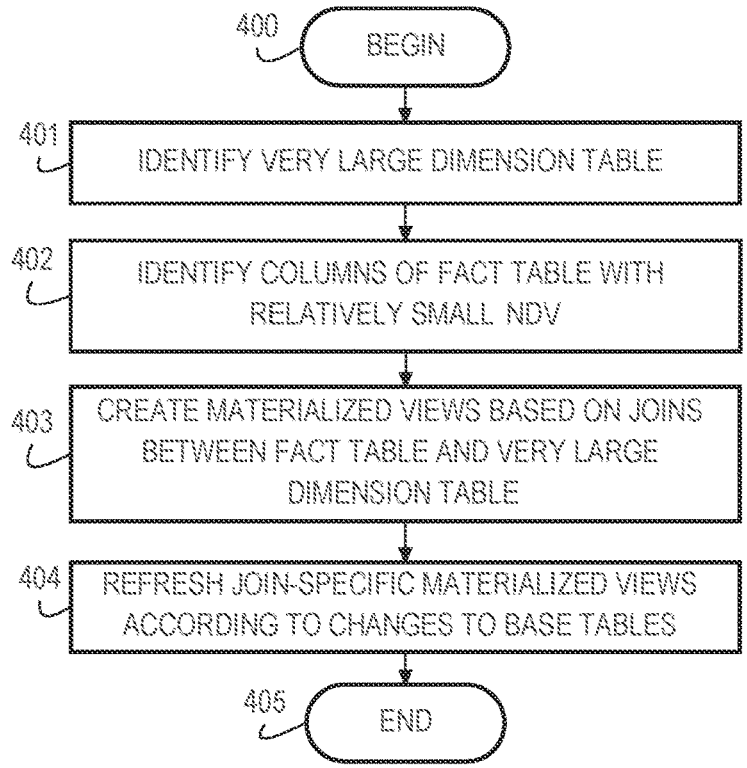
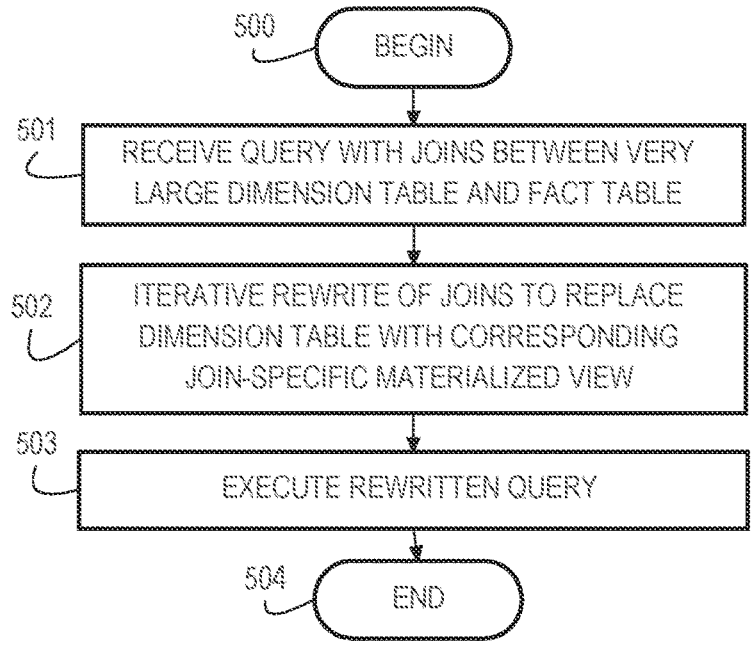

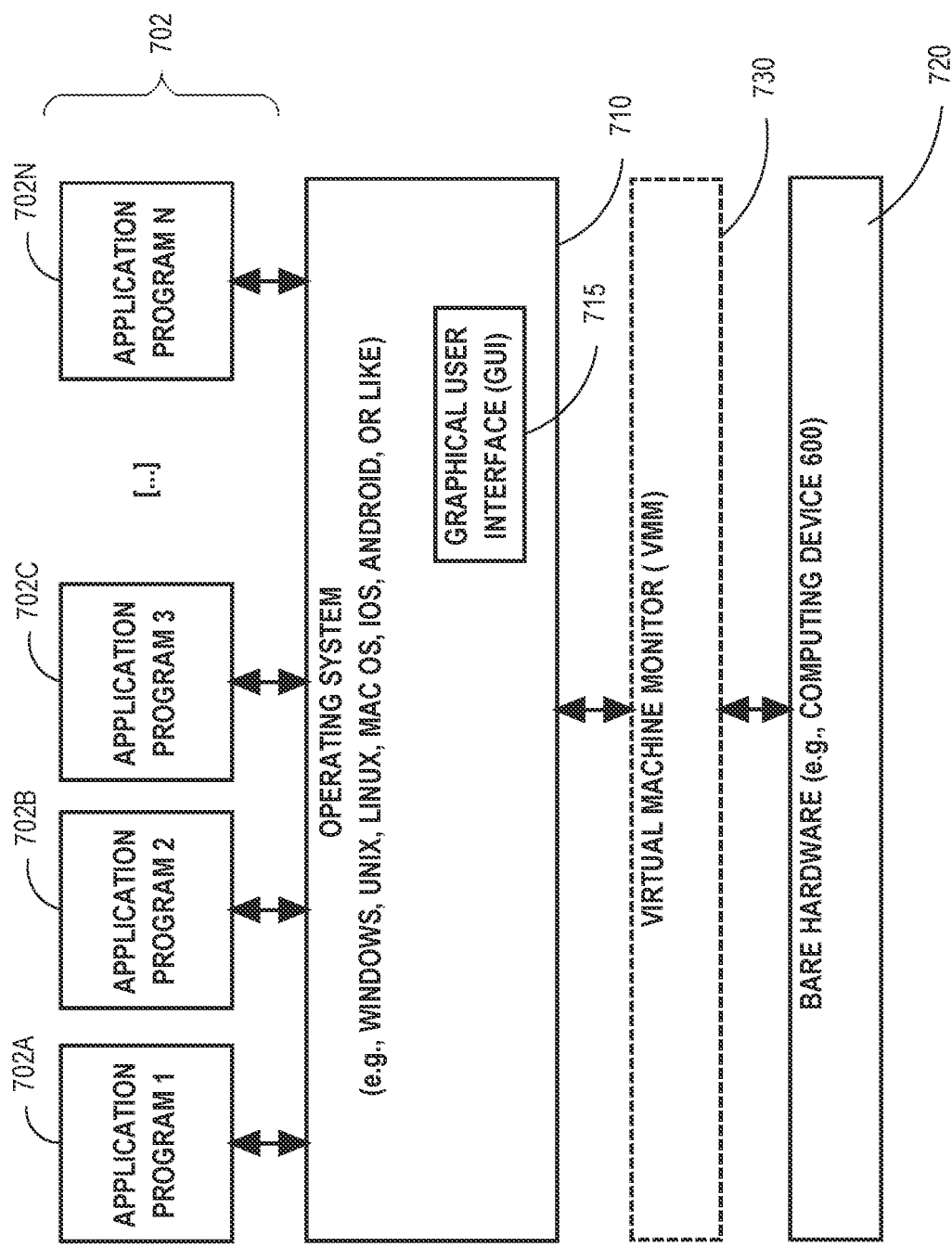

JOIN SPECIFIC MATERIALIZED VIEW QUERY REWRITE FOR QUERIES USING UNIFIED DIMENSION TABLES

FIELD OF THE INVENTION

The present invention relates to query rewrite for queries using unified large dimension tables and, more particularly, to join specific materialized view query rewrite for queries involving a join between a fact table and unified large dimension tables.

BACKGROUND

A schema is a collection of database objects, including tables, views, indexes, and synonyms. There are a variety of ways of arranging schema objects in the schema models designed for data warehousing. The most common data-warehouse schema model is a star schema. A star schema is characterized by one or more very large fact tables that contain the primary information in the data warehouse and one or more much smaller dimension tables (or lookup tables), each of which contains information about the entries for a particular attribute in the fact table. A star query is a join between a fact table and one or more lookup tables. Each lookup table is joined to the fact table using a primary-key to foreign-key join, but the lookup tables are not joined to each other.

A materialized view is in effect a view that is materialized as a table whose contents are periodically refreshed based on a query defining the view. The materialized view is refreshed against one or more "base" tables referenced by the query defining the view. Materialized views can dramatically improve query response time by pre-computing expensive aggregates specified by the view. Materialized views are a powerful tuning tool for database management systems ("DBMS"). A DBMS performing query optimization uses materialized views to transform an expensive query into an equivalent query by replacing the very large base tables referenced by a view, yielding orders of magnitude improvement in query performance. In current implementations, the query rewrite technology replaces fact tables that are base tables in the query with one or more suitable materialized views to speed up query performance. Replacing the fact tables with pre-computed materialized views works well and invariably results in improved query performance.

However, there are specialized data warehouse applications where a dimension table can be exceptionally large and store data from multiple dimensions. Such a table is referred to herein as a unified large dimension table. In general, a unified large dimension table stores dimensions for multiple distinct foreign keys of a fact table, where the number of distinct values (NDVs) is much larger for one of the foreign keys than another of the foreign keys. For example, a dimension table PARTIES may represent parties involved in orders in an order fact table. In this example, the PARTIES dimension table is a unification of multiple smaller dimension tables for customers, sellers, suppliers, shippers, etc. A fact table for orders may include a foreign key for supplier and a foreign key for shipper, for example, wherein foreign keys refer to a primary key value of the PARTIES dimension table. There are far more customers for orders than suppliers. Hence, the foreign key for customer contains far more distinct values than the foreign key for supplier.

Thus, a unified large dimension table often is large because the table is used to represent entities of different kinds, where each different kind of entity is a different dimension. For example, a unified large dimension table may be used to represent both customers and suppliers. A fact table could have a foreign key for a customer dimension and foreign key for a supplier dimension, wherein both foreign keys correspond to the primary key of the unified large dimension table representing parties, because a supplier in one order may be a customer in another order.

A unified large dimension table can sometimes be as large as ten million rows or more. Existing materialized view rewrite algorithms perform poorly because the fact table is assumed to be the only large table in the schema; therefore, materialized views are typically created for the fact table and not for dimension tables, which are small relative to the fact table by design. Thus, processing the unified large dimension table for a join with the fact table will still entail a great deal of overhead, such as performing a table scan for the entirety of the unified large dimension table.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Further, it should not be assumed that any of the approaches described in this section are well-understood, routine, or conventional merely by virtue of their inclusion in this section.

BRIEF DESCRIPTION OF THE DRAWINGS

In the drawings:

FIG. 4 is a flowchart illustrating operation of a DBMS for creating join-specific materialized views in accordance with an illustrative embodiment.

FIG. 5 is a flowchart illustrating operation of a DBMS for performing iterative query rewrite with join-specific materialized views in accordance with an illustrative embodiment.

FIG. 7 is a block diagram of a basic software system that may be employed for controlling the operation of computer system in accordance with an illustrative embodiment.

DETAILED DESCRIPTION

Figure 1:
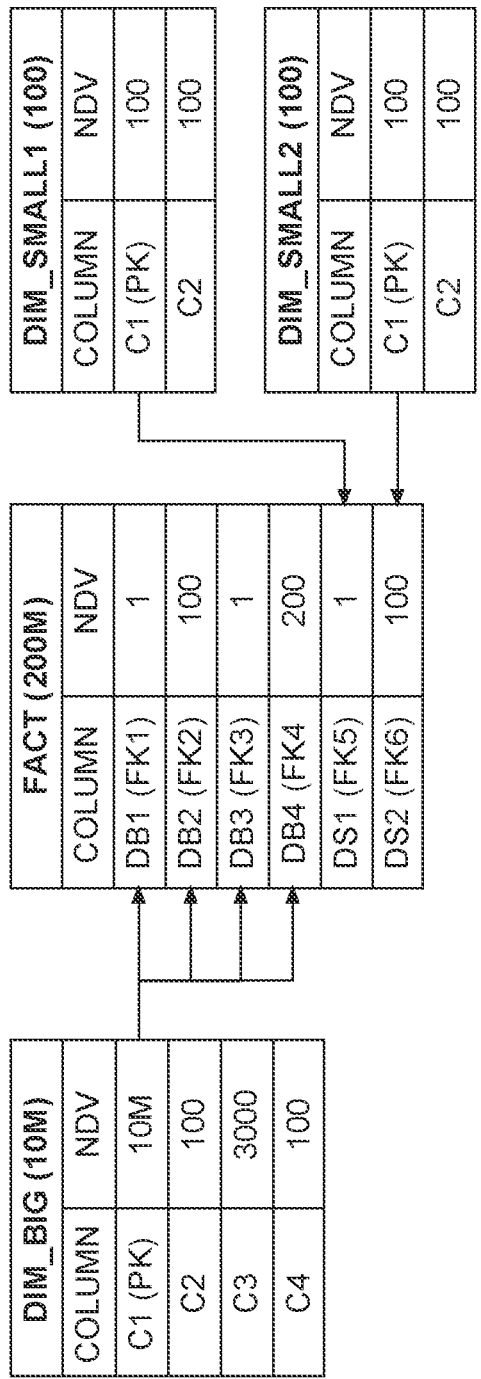
FIG. 1 depicts an example schema that illustrates the unified large dimension table problem to which aspects of the illustrative embodiments can be applied.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

The illustrative embodiments provide a materialized view query rewrite technology that dramatically improves query performance in the presence of unified large dimension tables. Without the embodiments described herein, the DBMS less effectively rewrites a query referencing a unified large dimension table, because the query rewrite algorithm defaults to replacing the fact table, which is typically the largest table in the schema, with a materialized view. The illustrative embodiments improve the query rewrite algorithm by replacing joins between the unified large dimension table and the fact tables with joins between a join-specific materialized view and the fact table. A join-specific materialized view materializes a join between a fact table and a unified large dimension table, where the join is based on a fact table foreign key of a primary key of the unified large dimension table. Ideal candidates for join-specific materialize views are joins involving a foreign key of a fact table where the foreign key contains a small number of distinct values than the respective primary key of the dimension table.

In some embodiments, once materialized views are created, a DBMS identifies relationships between the dimension tables and the foreign keys of the fact table to determine which relationships represent potential performance issues for joins. Thus, the DBMS identifies dimension tables having a large number of rows (i.e., high NDV of the primary key or high cardinality) relative to one or more foreign keys of the fact table. This relationship is referred to as a query rewrite condition and can be expressed as a ratio of the number of rows of the dimension table to the NDV of a given foreign key of the fact table. The DBMS then determines whether a dimension table satisfies the query rewrite condition by comparing the ratio of the number of rows of the dimension table to the NDV of a given foreign key of the fact table to a predetermined threshold (e.g., 100:1, 1000:1, etc.). In one embodiment, the DBMS creates a join-specific materialized view for each join between a dimension table and the fact table based on a given foreign key of the fact table such that the join satisfies the query rewrite condition. In one embodiment, the DBMS then notifies an optimizer that the join-specific materialized views are available to be used for query rewrites.

It is possible that a dimension table will satisfy the query rewrite condition for some foreign keys of the fact table and not others. For example, for the PARTIES unified dimension table that stores dimension for multiple foreign keys in the fact table, such as "customer," "seller," "supplier," and "shipper," the "customer" foreign key will have a higher NDV than the "supplier" foreign key. In this example, a join between the PARTIES unified dimension table and the fact table with "supplier" as the joining key may satisfy the query rewrite condition, while a join with "customer" as the joining key may not, depending on how the query rewrite condition is defined or configured.

At query rewrite time, for each join between a dimension table and the fact table based on a foreign key of the fact table for which the join satisfies the query rewrite condition, the join-specific materialized view replaces the dimension table rather than the fact table. The DBMS receives a query that requires one or more joins between a dimension table and the fact table based on one or more foreign key columns of the fact table. In response to a join satisfying the query rewrite condition, the DBMS rewrites the query to replace the join between the dimension table and the fact table with a join between a respective join-specific materialized view and the fact table. The DBMS then iterates over the query to replace each join that satisfies the query rewrite condition. In one embodiment, the DBMS determines that a join satisfies the query rewrite condition by determining that a corresponding join-specific materialized view is available for query rewrite.

Unified Large Dimension Table Problem

The unified large dimension table scenario applies to schemas that consist of one or more extremely large dimension tables, which are typically joined to a fact table with various foreign keys, each of which is found to have a small number of distinct values (NDV), i.e., the cardinality of the foreign keys. FIG. 1 depicts an example schema that illustrates the unified large dimension table problem to which aspects of the illustrative embodiments can be applied. As shown in the depicted example, the schema involves a very large dimension table, DIM_BIG, with 10 million rows, two typical sized dimension tables, DIM_SMALL1 and DIM_SMALL2, of 100 rows each, and a fact table, FACT, with 200 million rows.

A unified dimension table, such as DIM_BIG in FIG. 1, is typically created by merging many smaller dimension tables. In the depicted example, the very large dimension table, DIM_BIG, can be viewed as a unified dimension table that encapsulates data from multiple smaller dimension tables and, thus, is referred to as a unified large dimension table. For example, a very large unified dimension table that stores information about global automobile parts supply could be created by unifying many different dimension tables, each of which stores automobile parts sold in different regions, such as North America, South America, Europe, Asia, etc. As another example, a unified dimension table may store information about parties involved in orders, where the parties may be customers, sellers, suppliers, shippers, etc. The fact table may include a "customer" foreign key, a "seller" foreign key, a "supplier" foreign key," and a "shipper" foreign key, all of which refer to the primary key of the "parties" unified dimension table. However, aspects of the illustrative embodiments can be applied to very large dimension tables, whether or not they are unified dimension tables created by encapsulating data from multiple smaller dimension tables.

In the example in FIG. 1, the foreign keys of FACT, namely DB1, DB2, DB3, DB4, DS1, and DS2 have numbers of distinct values (NDVs) of 1, 100, 1, 200, 1, and 100, respectively. Given that the foreign keys of the fact table have relatively small NDVs, the distinguishing characteristic of such a schema is that many queries with joins involving the unified large dimension table, DIM_BIG, and the fact table, FACT, will invariably result in a small number of rows. Typically, the number of distinct values (NDV) of such joins are many orders of magnitude smaller than the cardinality of the unified large dimension table.

The following is an example query, Query 1, which typifies a customer usage that involves the unified dimension table:

```
SELECT DB1.C4, DB2.C4, DB3.C4, DS1.C2, DS2.C2, SUM(M1),
MAX(M2)
  FROM FACT F
  LEFT OUTER JOIN DIM_BIG DB1 ON F.DB1=DB2.C1
  LEFT OUTER JOIN DIM_BIG DB2 ON F.DB2=DB2.C1
  LEFT OUTER JOIN DIM_BIG DB3 ON F.DB3=DB3.C1
  LEFT OUTER JOIN DIM_BIG DB4 ON F.DB4=DB4.C1
  LEFT OUTER JOIN DIM_SMALL1 DS1 ON F.DS1=DS1.C1
  LEFT OUTER JOIN DIM_SMALL2 DS2 ON F.DS2=DS2.C1
GROUP BY DB1.C4, DB2.C4, DB3.C4, DB4.C4, DS1.C2, DS2.C2;
```

Note that even though the NDVs of the columns DB1, DB2, DB3, and DB4 are orders of magnitude smaller than the number of rows in DIM_BIG, the query will perform poorly as it will require a scan of all the rows of DIM_BIG to compute the joins. One could of course create a materialized view that consumes all the four joins between DIM_BIG and FACT; however, such a materialized view cannot be used to rewrite queries that contain any arbitrary subsets of the four joins.

Materialized View Based Query Rewrite

Figure 2:
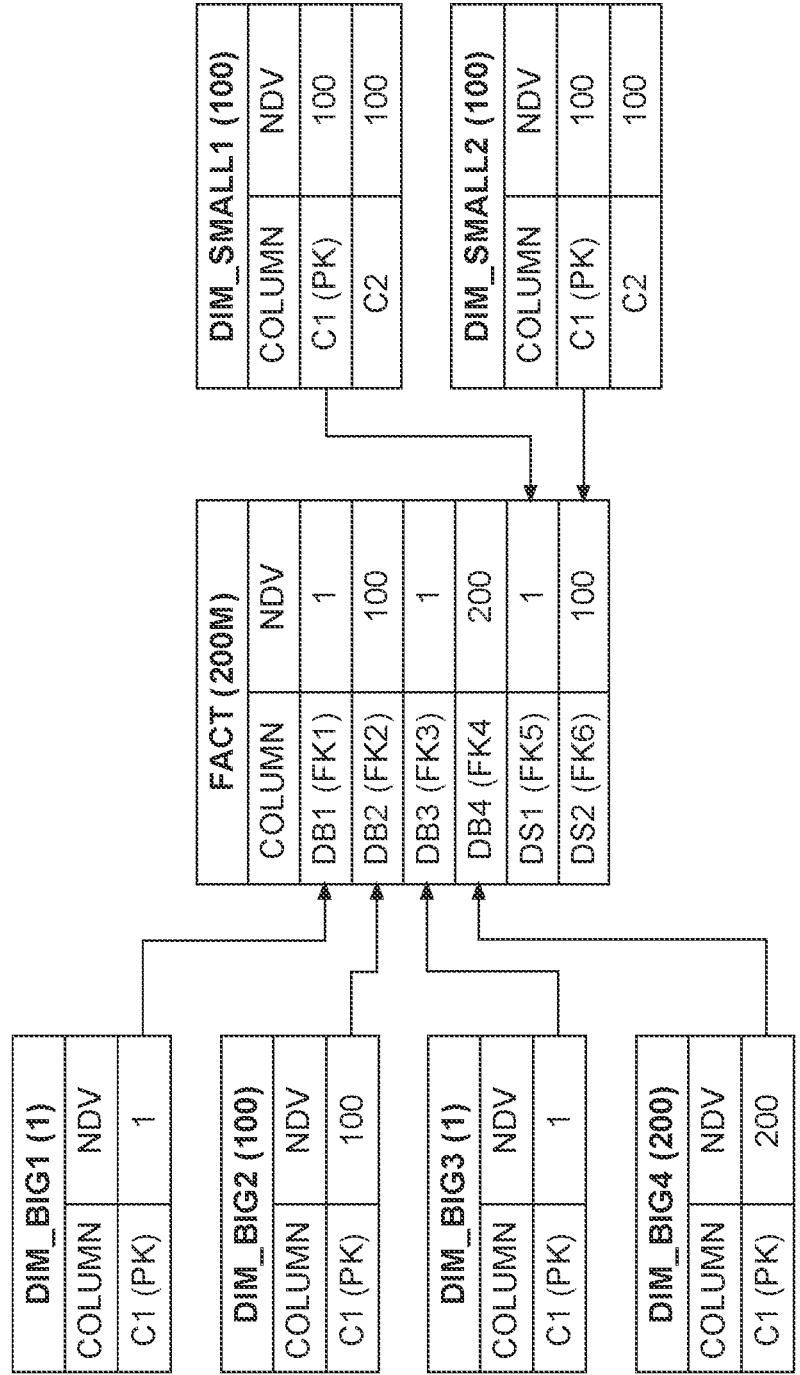
FIG. 2 depicts an example schema that illustrates conceptual decomposition of the unified dimension table in accordance with one embodiment.

FIG. 2 depicts an example schema that illustrates conceptual decomposition of the unified dimension table in accordance with one embodiment. Recognizing that the NDVs of the joining foreign keys of the fact tables are orders of magnitude smaller than the size of the unified dimension table, the unified dimension table, DIM_BIG, can be conceptually decomposed down to four smaller dimension table, namely DIM_BIG1, DIM_BIG2, DIM_BIG3, and DIM_BIG4, one for each of the joining foreign key columns of the fact table, FACT, as shown in FIG. 2. The idea of this conceptual decomposition of the unified dimension table is to create four individual materialized views, each materializing the corresponding join between the smaller dimension table and the fact table. This would enable an iterative rewrite of the original query with the four smaller materialized views. The final result is that the large unified dimension table, DIM_BIG, would be substituted with the four much smaller materialized views, with four identical joins between the materialized views and the fact table. Because the joins are now between the much smaller materialized views and the joining foreign keys of the fact table with small NDVs, a dramatic improvement in query performance is achieved.

For example, by decomposing the original larger unified dimension table into four smaller dimension tables, as shown in FIG. 2, the original query, Query 1, can instead be written as Query 2, as follows:

```
SELECT DB1.C4, DB2.C4, DB3.C4, DS1.C2, DS2.C2, SUM(M1),
    MAX(M2)
  FROM FACT F
  LEFT OUTER JOIN DIM_BIG1 DB1 ON F.DB1=DB2.C1
  LEFT OUTER JOIN DIM_BIG2 DB2 ON F.DB2=DB2.C1
  LEFT OUTER JOIN DIM_BIG3 DB3 ON F.DB3=DB3.C1
  LEFT OUTER JOIN DIM_BIG4 DB4 ON F.DB4=DB4.C1
  LEFT OUTER JOIN DIM_SMALL1 DS1 ON F.DS1=DS1.C1
  LEFT OUTER JOIN DIM_SMALL2 DS2 ON F.DS2=DS2.C1
GROUP BY DB1.C4, DB2.C4, DB3.C4, DB4.C4, DS1.C2, DS2.C2;
```

Assuming that the smaller decomposed dimension tables have already been created, because the above query only has joins between the foreign keys of the fact table with the smaller dimension tables, the query would run much faster than the original query with the much larger unified dimension table, because the query involves table scans of the four smaller decomposed dimension tables rather than four full table scans of the unified dimension table, DIM_BIG.

In accordance with an illustrative embodiment, instead of decomposing the original unified dimension table into smaller dimension tables, the DBMS creates four join-specific materialized views, one for each of the four joins between the unified dimension table and the fact table, as follows:

```
CREATE MATERIALIZED VIEW MV1
ENABLE QUERY REWRITE AS
SELECT * FROM DIM_BIG DB
WHERE EXISTS (SELECT 1 FROM FACT F
    WHERE F.DB1=DB.C1);
CREATE MATERIALIZED VIEW MV2
ENABLE QUERY REWRITE AS
SELECT * FROM DIM_BIG DB
WHERE EXISTS (SELECT 1 FROM FACT F
    WHERE F.DB2=DB.C1);
CREATE MATERIALIZED VIEW MV3
ENABLE QUERY REWRITE AS
SELECT * FROM DIM_BIG DB
WHERE EXISTS (SELECT 1 FROM FACT F
    WHERE F.DB3=DB.C1);
CREATE MATERIALIZED VIEW MV4
ENABLE QUERY REWRITE AS
SELECT * FROM DIM_BIG DB
WHERE EXISTS (SELECT 1 FROM FACT F
    WHERE F.DB4=DB.C1);
```

Figure 3:
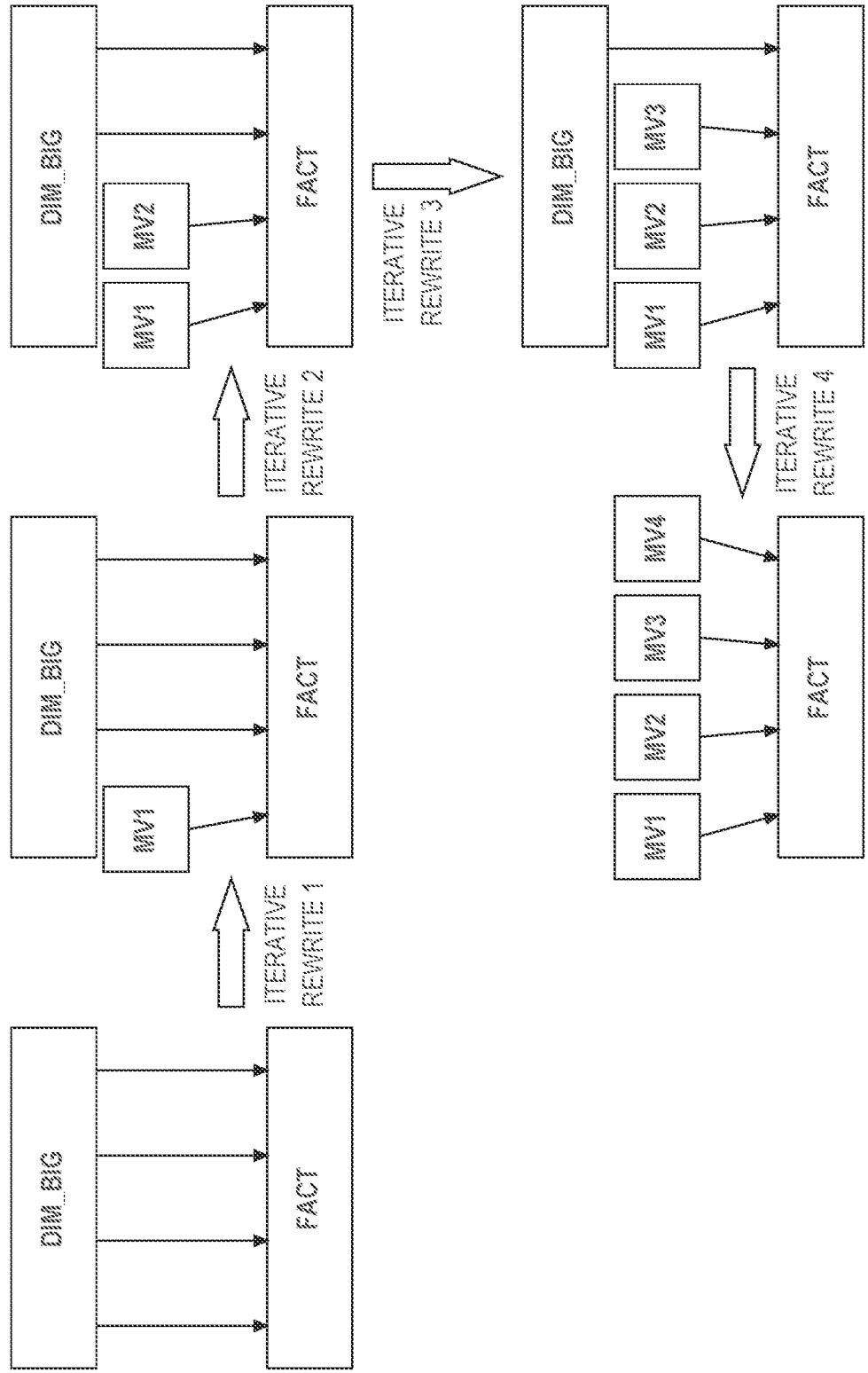
FIG. 3 depicts an iterative query rewrite approach in accordance with an illustrative embodiment.

The illustrative embodiment also enhances the query rewrite algorithm of the DBMS to recognize this scenario and replace the unified large dimension table in the original query, Query 1, with the above smaller materialized views using an iterative query rewrite approach. An eligibility algorithm of the DBMS identifies this scenario and replaces the unified dimension table, DIM_BIG, instead of replacing the fact table, as is done for the traditional query rewrite. FIG. 3 depicts an iterative query rewrite approach in accordance with an illustrative embodiment. As shown in FIG. 3, each join between the unified dimension table, DIM_BIG, and the fact table, FACT, is replaced with a join-specific materialized view, e.g., first MV1, then MV2, then MV3, and then MV4.

With the above materialized views in place, the original query, Query 1, referencing the unified dimension table, DIM_BIG, is rewritten as follows:

```
SELECT DB1.C4, DB2.C4, DB3.C4, DS1.C2, DS2.C2, SUM(M1),
    MAX(M2)
  FROM FACT F
  LEFT OUTER JOIN MV1 DB1 ON F.DB1=DB2.C1
  LEFT OUTER JOIN MV2 DB2 ON F.DB2=DB2.C1
  LEFT OUTER JOIN MV3 DB3 ON F.DB3=DB3.C1
  LEFT OUTER JOIN MV4 DB4 ON F.DB4=DB4.C1
  LEFT OUTER JOIN DIM_SMALL1 DS1 ON F.DS1=DS1.C1
  LEFT OUTER JOIN DIM_SMALL2 DS2 ON F.DS2=DS2.C1
GROUP BY DB1.C4, DB2.C4, DB3.C4, DB4.C4, DS1.C2, DS2.C2;
```

Note that the smaller materialized views, which represent the decomposed unified dimension tables, enable queries with an arbitrary subset of joins to rewrite, thereby increasing the potential for more queries to rewrite and improving the performance of the system.

The advantage of this kind of rewrite is beneficial only for unified dimensions as the dimension tables are very large and join eliminates the bulk of the rows.

For the example unified dimension table schema shown in FIG. 1, with a fact table the size of 200 million rows and a unified dimension table size of 10 million rows, the original query took 2 minutes and 56 seconds without the materialized view rewrite, while the same query took only 4 seconds using the iterative query rewrite approach using the four smaller materialized views. In some cases, a complex insert statement without using the materialized view-based query rewrite of the illustrative embodiments can take nearly 16 hours to complete, while the same insert statement using a manual implementation of decomposed dimension tables can take only 2 hours to complete. Note also that the time creation of the decomposed dimension tables can take only 10 minutes, while the decomposed dimension tables could benefit other insert statements.

In accordance with some embodiments, the DBMS applies a heuristic to determine which join-specific materialized views (JSMVs) to create and maintain based on the schema of the database. For example, as stated above, the materialized view-based query rewrite approach can improve performance when the size of the dimension table is orders of magnitude larger than the NDV of the joining foreign key of the fact table being joined. Therefore, the DBMS can determine for which foreign keys of the fact table there is a N:1 ratio between the number of rows in dimension table and the NDV of the foreign key, where N is a configuration parameter. In one example embodiment, N is 100, such that the DBMS creates a join-specific materialized view that consumes a corresponding join between the dimension table and the fact table if a ratio between the number of rows of the dimension table and the NDV of the joining foreign key of the join is 100:1. For instance, in the example shown in FIG. 1, the ratio for a join between C1 of DIM_BIG and DB1 of FACT is 10M:1, the ratio for a join between C1 of DIM_BIG and DB2 of FACT is 100K:1, the ratio for a join between C1 of DIM_BIG and DB3 of FACT is 10M:1, and the ratio for a join between C1 of DIM_BIG and DB4 of FACT is 50k:1, all of which satisfy the 100:1 criterion.

In some embodiments, the DBMS determines whether a join-specific materialized view exists for a join in a query. If the DBMS determines a join-specific materialized view exists, then the DBMS replaces the reference to the dimension table with a reference to the corresponding materialized view. In one embodiment, the DBMS iterates over joins between dimension tables and the fact table in the query until all joins that meet the query rewrite condition are replaced, in this example any join between a large dimension table and a foreign key of the fact table for which there is a join-specific materialized view.

Further details of materialized views and query rewrite technology are described in U.S. Pat. No. 6,345,272, filed Jul. 27, 1999, and issued Feb. 5, 2002, U.S. Pat. No. 6,496,819, filed Dec. 28, 1998, and issued Dec. 17, 2002, U.S. Pat. No. 6,477,525, filed Dec. 28, 1998, and issued Nov. 5, 2002, and U.S. Pat. No. 7,440,963, filed Jul. 7, 2003, and issued Oct. 21, 2008, the entire contents of which are incorporated by reference as if fully set forth herein.

Although this approach is more beneficial in case of left outer joins, the approach can perform query rewrite if there are inner joins as well.

For example, consider the following notations:

```
Inner join: TAB1.COL1 = TAB2.COL2
Left Semi join: TAB1.COL1 SJ = TAB2.COL2
Outer join: TAB1.COL1(+) = TAB2.COL2
```

For queries having inner joins:

```
User Query: DIM.C1 = FACT.C2
JSMV: DIM.C1 SJ = FACT.C2
```

The query would be rewritten as follows: JSMV.C1=FACT.C2

For queries having outer joins, the table in the JSMV participates in the NULL AUGMENTED side of the outer join in the query (most useful case).

```
User Query: DIM.C1(+) = FACT.C2
JSMV: DIM.C1 SJ = FACT.C2
```

The query would be rewritten as follows: JSMV.C1(+)=FACT.C2

Consider the following:

```
Query 3: select * from fact f, dim d where f.x=d.x1(+);
Query 4: select * from fact f, (select * from dim d where
exists (select 1 from fact f where f.x=d.x1)) dim_iv where
f.x=dim_iv.x1(+);
Query 5: select * from fact f, dim_mv d where f.x=d.x1(+);
Materialized view,dim_mv: select * from dim d where exists
(select 1 from fact f where f.x=d.x1);
```

As Query 3 and Query 4 are equivalent, for an incoming Query 3, if there is an MV(dim_mv) equivalent to dim_iv, then Query 3 will be transformed to Query 5. For this example, the approach does not need constraints.

Procedural Over View

FIG. 4 is a flowchart illustrating operation of a DBMS for creating join-specific materialized views in accordance with an illustrative embodiment. Operation begins (block 400), and DBMS identifies a very large dimension table (block 401). In one embodiment, the DBMS identifies a dimension table having a number of rows that is greater than a predetermined threshold. For example, the predetermined threshold can be selected to identify dimension tables that are likely to have a number of rows that are orders of magnitude greater than the NDVs of the joining foreign keys of the fact table. In another example, the predetermined threshold can be selected based on the maximum or average NDV value for the joining foreign keys of the fact table. In an alternative embodiment, the DBMS may consider all dimension tables as very large dimension tables in block 401. A very large dimension table identified in block 401 may be a unified dimension table, which are typically created by merging many smaller dimension tables; however, any very large dimension table may benefit from the join-specific materialized views if the query rewrite condition is met, as will be discussed below.

The DBMS identifies foreign key columns of the fact table with relatively small NDVs (block 402). In some embodiments, the DBMS identifies foreign keys having an NDV that is orders of magnitude smaller than the number of rows in the dimension table identified in block 401. In one embodiment, the DBMS identifies foreign key columns of the fact table for which the ratio of rows in the identified dimension table and the NDV of the column is greater than a predetermined ratio, which is referred herein to as a query rewrite condition.

The DBMS then creates materialized views based on joins between the fact table and the identified very large dimension table (block 403). That is, the DBMS creates join-specific materialized views for each join between the identified very large dimension table and a joining foreign key of the fact table for which the ratio between the number of rows of the very large dimension table and the NDV of the foreign key column meets the above query rewrite condition.

Also, the DBMS refreshes the join-specific materialized views according to changes to the base tables (block 404). Thereafter, operation ends (block 405).

FIG. 5 is a flowchart illustrating operation of a DBMS for performing iterative query rewrite with join-specific materialized views in accordance with an illustrative embodiment. Operation begins (block 500), and the DBMS receives a query with joins between a very large dimension table and a fact table (block 501). The DBMS then performs iterative rewrite of joins to replace the dimension table with the corresponding join-specific materialized view (block 502). In some embodiments, the DBMS iterates over the joins in the query and determines whether the join meets one or more query rewrite criteria or conditions. For example, the database engine may determine whether each join is between the very large dimension table and a foreign key of the fact table, whether the size of the very large dimension table is orders of magnitude greater than the NDV of the foreign key, and/or whether there is a join-specific materialized view of the join. For each join that meets the one or more query rewrite criteria, the DBMS replaces a reference to the very large dimension table with a reference to the corresponding join-specific materialized view. Thereafter, the database system executes the rewritten query (block 503), and operation ends (block 504).

DBMS Over View

A database management system (DBMS) manages a database. A DBMS may comprise one or more database servers. A database comprises database data and a database dictionary that are stored on a persistent memory mechanism, such as a set of hard disks. Database data may be stored in one or more collections of records. The data within each record is organized into one or more attributes. In relational DBMSs, the collections are referred to as tables (or data frames), the records are referred to as records, and the attributes are referred to as attributes. In a document DBMS ("DOCS"), a collection of records is a collection of documents, each of which may be a data object marked up in a hierarchical-markup language, such as a JSON object or XML document. The attributes are referred to as JSON fields or XML elements. A relational DBMS may also store hierarchically marked data objects; however, the hierarchically marked data objects are contained in an attribute of record, such as JSON typed attribute.

Users interact with a database server of a DBMS by submitting to the database server commands that cause the database server to perform operations on data stored in a database. A user may be one or more applications running on a client computer that interacts with a database server. Multiple users may also be referred to herein collectively as a user.

A database command may be in the form of a database statement that conforms to a database language. A database language for expressing the database commands is the Structured Query Language (SQL). There are many different versions of SQL; some versions are standard and some proprietary, and there are a variety of extensions. Data definition language ("DDL") commands are issued to a database server to create or configure data objects referred to herein as database objects, such as tables, views, or complex data types. SQL/XML is a common extension of SQL used when manipulating XML data in an object-relational database. Another database language for expressing database commands is Spark™ SQL, which uses a syntax based on function or method invocations.

In a DOCS, a database command may be in the form of functions or object method calls that invoke CRUD (Create Read Update Delete) operations. An example of an API for such functions and method calls is MQL (MondoDB™ Query Language). In a DOCS, database objects include a collection of documents, a document, a view, or fields defined by a JSON schema for a collection. A view may be created by invoking a function provided by the DBMS for creating views in a database.

Changes to a database in a DBMS are made using transaction processing. A database transaction is a set of operations that change database data. In a DBMS, a database transaction is initiated in response to a database command requesting a change, such as a DML command requesting an update, insert of a record, or a delete of a record or a CRUD object method invocation requesting to create, update or delete a document. DML commands and DDL specify changes to data, such as INSERT and UPDATE statements. A DML statement or command does not refer to a statement or command that merely queries database data. Committing a transaction refers to making the changes for a transaction permanent.

Under transaction processing, all the changes for a transaction are made atomically. When a transaction is committed, either all changes are committed, or the transaction is rolled back. These changes are recorded in change records, which may include redo records and undo records. Redo records may be used to reapply changes made to a data block. Undo records are used to reverse or undo changes made to a data block by a transaction.

An example of such transactional metadata includes change records that record changes made by transactions to database data. Another example of transactional metadata is embedded transactional metadata stored within the database data, the embedded transactional metadata describing transactions that changed the database data.

Undo records are used to provide transactional consistency by performing operations referred to herein as consistency operations. Each undo record is associated with a logical time. An example of logical time is a system change number (SCN). An SCN may be maintained using a Lamporting mechanism, for example. For data blocks that are read to compute a database command, a DBMS applies the needed undo records to copies of the data blocks to bring the copies to a state consistent with the snap-shot time of the query. The DBMS determines which undo records to apply to a data block based on the respective logical times associated with the undo records.

In a distributed transaction, multiple DBMSs commit a distributed transaction using a two-phase commit approach. Each DBMS executes a local transaction in a branch transaction of the distributed transaction. One DBMS, the coordinating DBMS, is responsible for coordinating the commitment of the transaction on one or more other database systems. The other DBMSs are referred to herein as participating DBMSs.

A two-phase commit involves two phases, the prepare-to-commit phase, and the commit phase. In the prepare-to-commit phase, branch transaction is prepared in each of the participating database systems. When a branch transaction is prepared on a DBMS, the database is in a "prepared state" such that it can guarantee that modifications executed as part of a branch transaction to the database data can be committed. This guarantee may entail storing change records for the branch transaction persistently. A participating DBMS acknowledges when it has completed the prepare-to-commit phase and has entered a prepared state for the respective branch transaction of the participating DBMS.

In the commit phase, the coordinating database system commits the transaction on the coordinating database system and on the participating database systems. Specifically, the coordinating database system sends messages to the participants requesting that the participants commit the modifications specified by the transaction to data on the participating database systems. The participating database systems and the coordinating database system then commit the transaction.

On the other hand, if a participating database system is unable to prepare or the coordinating database system is unable to commit, then at least one of the database systems is unable to make the changes specified by the transaction. In this case, all of the modifications at each of the participants and the coordinating database system are retracted, restoring each database system to its state prior to the changes.

A client may issue a series of requests, such as requests for execution of queries, to a DBMS by establishing a database session. A database session comprises a particular connection established for a client to a database server through which the client may issue a series of requests. A database session process executes within a database session and processes requests issued by the client through the database session. The database session may generate an execution plan for a query issued by the database session client and marshal slave processes for execution of the execution plan.

The database server may maintain session state data about a database session. The session state data reflects the current state of the session and may contain the identity of the user for which the session is established, services used by the user, instances of object types, language and character set data, statistics about resource usage for the session, temporary variable values generated by processes executing software within the session, storage for cursors, variables, and other information.

A database server includes multiple database processes. Database processes run under the control of the database server (i.e., can be created or terminated by the database server) and perform various database server functions. Database processes include processes running within a database session established for a client.

A database process is a unit of execution. A database process can be a computer system process or thread or a user-defined execution context such as a user thread or fiber. Database processes may also include "database server system" processes that provide services and/or perform functions on behalf of the entire database server. Such database server system processes include listeners, garbage collectors, log writers, and recovery processes.

A multi-node database management system is made up of interconnected computing nodes ("nodes"), each running a database server that shares access to the same database. Typically, the nodes are interconnected via a network and share access, in varying degrees, to shared storage, e.g., shared access to a set of disk drives and data blocks stored thereon. The nodes in a multi-node database system may be in the form of a group of computers (e.g., work stations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance." A database server may comprise multiple database instances, some or all of which are running on separate computers, including separate server blades.

A database dictionary may comprise multiple data structures that store database metadata. A database dictionary may, for example, comprise multiple files and tables. Portions of the data structures may be cached in main memory of a database server.

When a database object is said to be defined by a database dictionary, the database dictionary contains metadata that defines properties of the database object. For example, metadata in a database dictionary defining a database table may specify the attribute names and data types of the attributes, and one or more files or portions thereof that store data for the table. Metadata in the database dictionary defining a procedure may specify a name of the procedure, the procedure's arguments and the return data type, and the data types of the arguments, and may include source code and a compiled version thereof.

A database object may be defined by the database dictionary, but the metadata in the database dictionary itself may only partly specify the properties of the database object. Other properties may be defined by data structures that may not be considered part of the database dictionary. For example, a user-defined function implemented in a JAVA class may be defined in part by the database dictionary by specifying the name of the user-defined function and by specifying a reference to a file containing the source code of the Java class (i.e., .java file) and the compiled version of the class (i.e., .class file).

A database object may have an attribute that is a primary key. A primary key contains primary key values. A primary key value uniquely identifies a record among the records in the database object. For example, a database table may include a column that is a primary key. Each row in the database table holds a primary key value that uniquely identifies the row among the rows in the database table.

A database object may have an attribute that is a foreign key of a primary key of another database object. A foreign key of a primary key contains primary key values of the primary key. Thus, a foreign key value in the foreign key uniquely identifies a record in the respective database object of the primary key.

A foreign key constraint based on a primary key may be defined for a foreign key. A DBMS ensures that any value in the foreign key exists in the primary key. A foreign key need not be defined for a foreign key. Instead, a foreign key relationship may be defined for the foreign key. Applications that populate the foreign key are configured to ensure that foreign key values in the foreign key exist in the respective primary. An application may maintain a foreign key in this way even when no foreign relationship is defined for the foreign key.

Hardware Overview

According to one embodiment, the techniques described herein are implemented by one or more special-purpose computing devices. The special-purpose computing devices may be hard-wired to perform the techniques or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
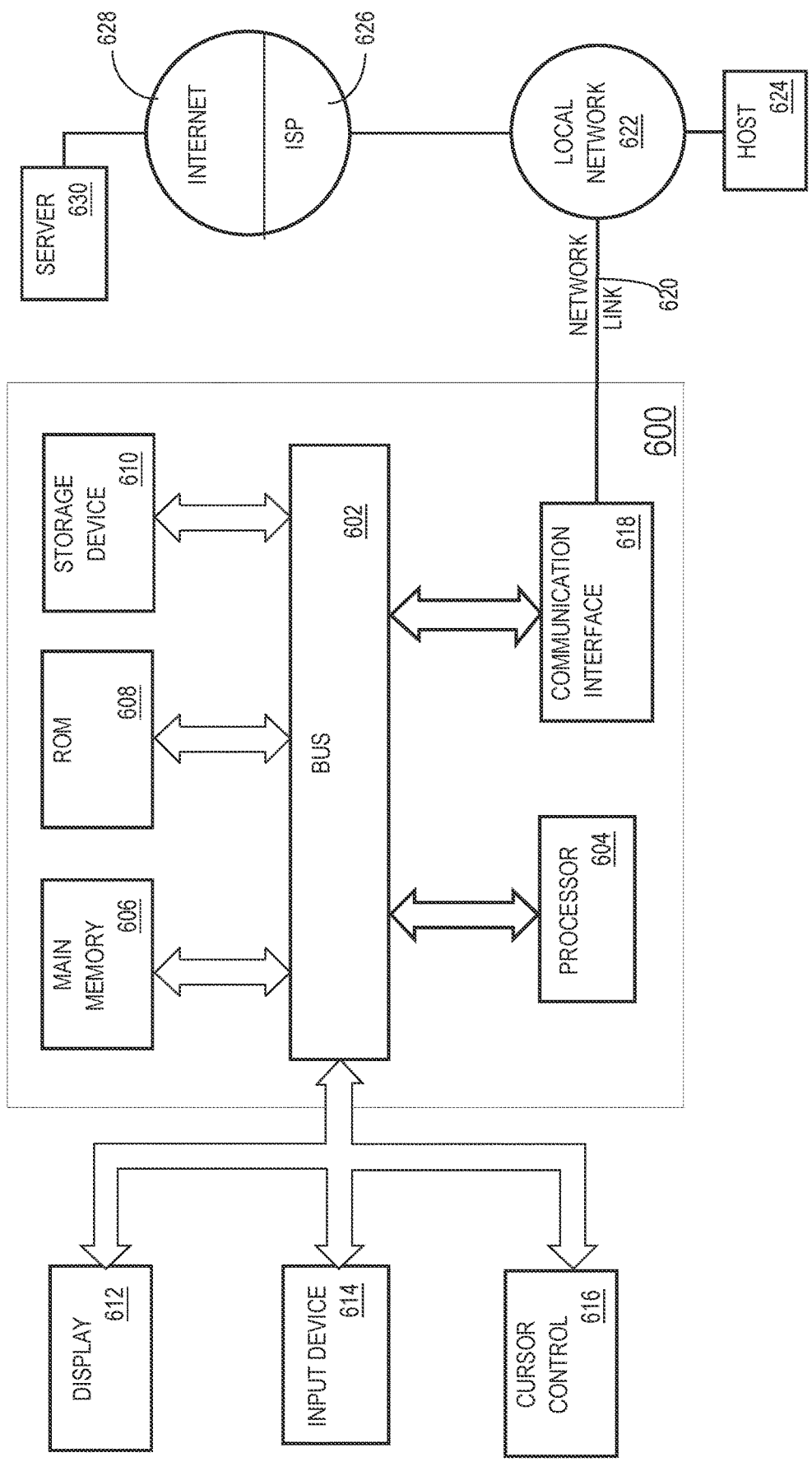
FIG. 6 is a block diagram that illustrates a computer system upon which aspects of the illustrative embodiments may be implemented.

For example, FIG. 6 is a block diagram that illustrates a computer system 600 upon which aspects of the illustrative embodiments may be implemented. Computer system 600 includes a bus 602 or other communication mechanism for communicating information, and a hardware processor 604 coupled with bus 602 for processing information. Hardware processor 604 may be, for example, a general-purpose microprocessor.

Computer system 600 also includes a main memory 606, such as a random-access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk, optical disk, or solid-state drive is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 610. Volatile media includes dynamic memory, such as main memory 606. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid-state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic, or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world-wide packet data communication network now commonly referred to as the "Internet" 628. Local network 622 and Internet 628 both use electrical, electromagnetic, or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

Software Overview

FIG. 7 is a block diagram of a basic software system 700 that may be employed for controlling the operation of computer system 700. Software system 700 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 700 is provided for directing the operation of computer system 600. Software system 700, which may be stored in system memory (RAM) 606 and on fixed storage (e.g., hard disk or flash memory) 610, includes a kernel or operating system (OS) 710.

The OS 710 manages low-level aspects of computer operation, including managing execution of processes, memory allocation, file input and output (I/O), and device I/O. One or more application programs, represented as 702A, 702B, 702C . . . 702N, may be "loaded" (e.g., transferred from fixed storage 610 into memory 606) for execution by the system 700. The applications or other software intended for use on computer system 600 may also be stored as a set of downloadable computer-executable instructions, for example, for downloading and installation from an Internet location (e.g., a Web server, an app store, or other online service).

Software system 700 includes a graphical user interface (GUI) 715, for receiving user commands and data in a graphical (e.g., "point-and-click" or "touch gesture") fashion. These inputs, in turn, may be acted upon by the system 700 in accordance with instructions from operating system 710 and/or application(s) 702. The GUI 715 also serves to display the results of operation from the OS 710 and application(s) 702, whereupon the user may supply additional inputs or terminate the session (e.g., log off).

OS 710 can execute directly on the bare hardware 720 (e.g., processor(s) 604) of computer system 600. Alternatively, a hypervisor or virtual machine monitor (VMM) 730 may be interposed between the bare hardware 720 and the OS 710. In this configuration, VMM 730 acts as a software "cushion" or virtualization layer between the OS 710 and the bare hardware 720 of the computer system 600.

VMM 730 instantiates and runs one or more virtual machine instances ("guest machines"). Each guest machine comprises a "guest" operating system, such as OS 710, and one or more applications, such as application(s) 702, designed to execute on the guest operating system. The VMM 730 presents the guest operating systems with a virtual operating platform and manages the execution of the guest operating systems.

In some instances, the VMM 730 may allow a guest operating system to run as if it is running on the bare hardware 720 of computer system 600 directly. In these instances, the same version of the guest operating system configured to execute on the bare hardware 720 directly may also execute on VMM 730 without modification or reconfiguration. In other words, VMM 730 may provide full hardware and CPU virtualization to a guest operating system in some instances.

In other instances, a guest operating system may be specially designed or configured to execute on VMM 730 for efficiency. In these instances, the guest operating system is "aware" that it executes on a virtual machine monitor. In other words, VMM 730 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g., content of registers) between allotments of the hardware processor time when the computer system process is not running. Computer system processes run under the control of an operating system and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-executed method comprising:
   creating, in a database system executing on one or more computing devices, a plurality of materialized views based on a fact table and a dimension table having a primary key column, wherein:
      the fact table comprises a plurality of foreign key columns, each foreign key column within the plurality of foreign key columns being a foreign key of the primary key column, and
      each materialized view of the plurality of materialized views corresponds to a respective foreign key column of the plurality of foreign key columns and is based on a join between the dimension table and the fact table using the respective foreign key column as a join key of the join; and
   executing, by the database system, a query against the fact table and the dimension table, the query requiring a given join between the dimension table and the fact table using a particular foreign key column of the plurality of foreign key columns as a join key of the given join, wherein executing the query comprises:
      responsive to the given join satisfying one or more rewrite criteria, rewriting the query to form a modified query, wherein the rewriting the query includes replacing the given join between the dimension table and the fact table with a join between a respective materialized view, corresponding to the particular foreign key column, and the fact table; and
      executing, by the database system, the modified query to produce a query result based on contents of the respective materialized view and the fact table.

2. The method of claim 1, wherein the dimension table is a unified dimension table created by merging multiple smaller dimension tables.

3. The method of claim 1, wherein rewriting the query comprises performing an iterative query rewrite of one or more joins in by the query.

4. The method of claim 1, wherein a query rewrite criterion of the one or more query rewrite criteria comprises a ratio of a number of rows of the dimension table to a number of distinct values of a joining foreign key of the given join being greater than a threshold.

5. The method of claim 1, wherein creating the plurality of materialized views based on the fact table and the dimension table comprises creating a materialized view for each given foreign key for which a ratio of a number of rows of the dimension table to a number of distinct values of the given foreign key is greater than a threshold.

6. The method of claim 1, wherein the given join is a left outer join operation.

7. The method of claim 1, wherein the query further involves one or more joins combining rows from the fact table and rows from another dimension table that does not satisfy the one or more rewrite criteria.

8. The method of claim 1, further comprising refreshing the plurality of materialized views.

9. One or more non-transitory storage media storing one or more sequences of instructions which, when executed by one or more computing devices, cause:
   creating, in a database system executing on one or more computing devices, a plurality of materialized views based on a fact table and a dimension table having a primary key column, wherein:
      the fact table comprises a plurality of foreign key columns, each foreign key column within the plurality of foreign key columns being a foreign key of the primary key column, and
      each materialized view of the plurality of materialized views corresponds to a respective foreign key column of the plurality of foreign key columns and is based on a join between the dimension table and the fact table using the respective foreign key column as a join key of the join; and
   executing, by the database system, a query against the fact table and the dimension table, the query requiring a given join between the dimension table and the fact table using a particular foreign key column of the plurality of foreign key columns as a join key of the given join, wherein executing the query comprises:
      responsive to the given join satisfying one or more rewrite criteria, rewriting the query to form a modified query, wherein the rewriting the query includes replacing the given join between the dimension table and the fact table with a join between a respective materialized view, corresponding to the particular foreign key column, and the fact table; and
      executing, by the database system, the modified query to produce a query result based on contents of the respective materialized view and the fact table.

10. The one or more non-transitory storage media of claim 9, wherein the dimension table is a unified dimension table created by merging multiple smaller dimension tables.

11. The one or more non-transitory storage media of claim 9, wherein rewriting the query comprises performing an iterative query rewrite of one or more joins in by the query.

12. The one or more non-transitory storage media of claim 9, wherein a query rewrite criterion of the one or more query rewrite criteria comprises a ratio of a number of rows of the dimension table to a number of distinct values of a joining foreign key of the given join being greater than a threshold.

13. The one or more non-transitory storage media of claim 9, wherein creating the plurality of materialized views based on the fact table and the dimension table comprises creating a materialized view for each given foreign key for which a ratio of a number of rows of the dimension table to a number of distinct values of the given foreign key is greater than a threshold.

14. The one or more non-transitory storage media of claim 9, wherein the given join is a left outer join operation.

15. The one or more non-transitory storage media of claim 9, wherein the query further involves one or more joins combining rows from the fact table and rows from another dimension table that does not satisfy the one or more rewrite criteria.

16. The one or more non-transitory storage media of claim 9, wherein the one or more sequences of instructions include instructions that, when executed by one or more computer devices, cause refreshing the plurality of materialized views.

17. A computer-executed method comprising:
creating, in a database system executing on one or more computing devices, one or more materialized views based on one or more fact tables and a dimension table having a primary key column, wherein:
the one or more fact tables comprise a plurality of foreign key columns, each foreign key column within the plurality of foreign key columns being a foreign key of the primary key column, and
each materialized view of the one or more materialized views corresponds to a respective foreign key column of the plurality of foreign key columns and is based on a join between the dimension table and a respective fact table of said one or more fact tables using the respective foreign key column of said respective fact table as a join key of the join; and
executing, by the database system, a query against a particular fact table of said one or more fact tables and the dimension table, the query requiring a given join between the dimension table and the particular fact table using a particular foreign key column of the plurality of foreign key columns as a join key of the given join, wherein executing the query comprises:
responsive to the given join satisfying one or more rewrite criteria, rewriting the query to form a modified query, wherein the rewriting the query includes replacing the given join between the dimension table and the particular fact table with a join between a respective materialized view, corresponding to the particular foreign key column, and the particular fact table; and
executing, by the database system, the modified query to produce a query result based on contents of the respective materialized view and the particular fact table.

18. The method of claim 17, wherein rewriting the query comprises performing an iterative query rewrite of one or more joins in the query.

19. The method of claim 17, wherein a query rewrite criterion of the one or more query rewrite criteria comprises a ratio of a number of rows of the dimension table to a number of distinct values of a joining foreign key of the given join being greater than a threshold.

20. The method of claim 17, further comprising refreshing the one or more materialized views.

* * * * *